P. KENNEDY.
DRIVING CAR LIGHTING DYNAMOS.
APPLICATION FILED OCT. 7, 1909.
1,031,651.
Patented July 2, 1912.
2 SHEETS—SHEET 1.
Fig.1,
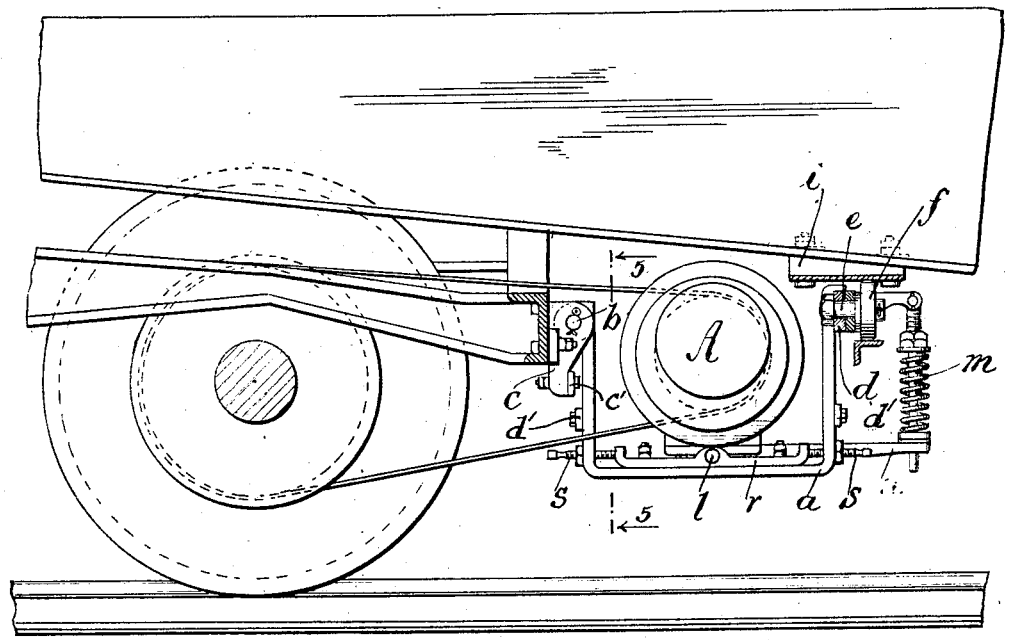
Fig.2,
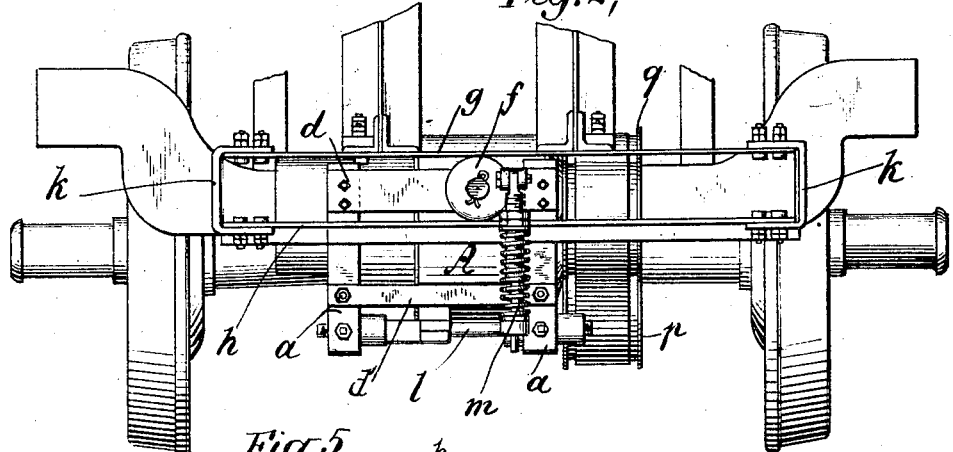
Fig.5,
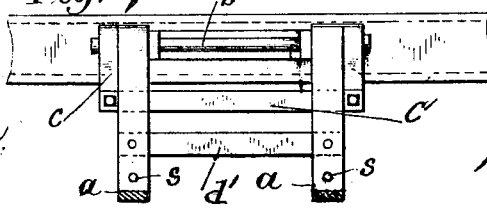
WITNESSES:
INVENTOR
Patrick Kennedy
BY
ATTORNEYS P. KENNEDY.
DRIVING CAR LIGHTING DYNAMOS.
APPLICATION FILED OCT. 7, 1909.
1,031,651.
Patented July 2, 1912.
2 SHEETS—SHEET 2.
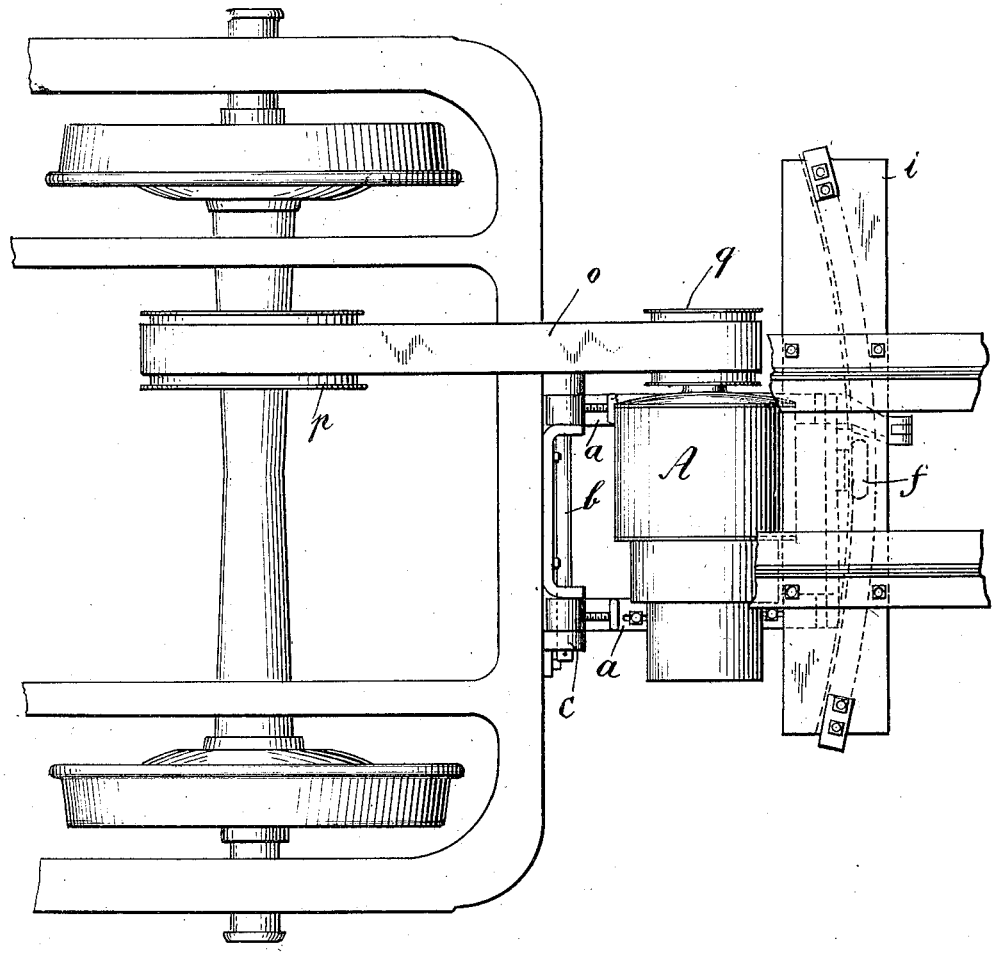
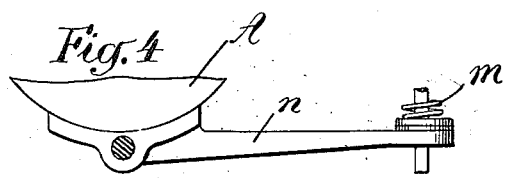

UNITED STATES PATENT OFFICE.

PATRICK KENNEDY, OF NEW YORK, N. Y.

DRIVING CAR-LIGHTING DYNAMOS.

1,031,651.  Specification of Letters Patent.  Patented July 2, 1912.

Application filed October 7, 1909. Serial No. 521,467.

*To all whom it may concern:*

Be it known that I, PATRICK KENNEDY, a citizen of the United States, residing at New York, in the county and State of New York, have invented certain new and useful Improvements in Driving Car-Lighting Dynamos; and I do hereby declare the following to be a full, clear, and exact description of the invention, such as will enable others skilled in the art to which it appertains to make and use the same.

Car-lighting dynamos have heretofore been supported inside the cross-beams of the truck frame, or, as an alternative, from the under body of the car. The first mode of suspension is unsatisfactory by reason of the inaccessibility of the parts, and the limited space available, and particularly by reason of the fact that the dynamo is brought so close to the axle from which it is driven as to practically prevent a successful belt drive. A second mode of suspension is unsatisfactory because in turning curves the car-body moves angularly with respect to the truck in a horizontal plane, and tips in a vertical plane, thereby disturbing the driving connection between the axle of the truck and the shaft of the dynamo. To obviate these defects the outside suspension was developed, in which the dynamo is mounted in a cradle supported wholly from, and outside of, the end cross beam of the truck. With this mode of suspension the dynamo moves as the truck moves, to maintain the necessary parallelism and the driving belt is lengthened, but such suspension has the objectionable feature that the dynamo and its suspending mechanism must be crowded into a vertical space which is limited on the one hand by the necessity for raising it a suitable distance above the track, and on the other hand, by the necessity for keeping the highest point of the dynamo far enough below the underbody of the car to avoid the striking of the dynamo or its support against the underbody upon the vertical movement of the underbody which occurs upon coupling the cars and upon starting and stopping the train, etc. This difficulty imposes marked limitations on otherwise desirable features of support, necessitates the placing of the dynamo very close to the end cross-beam of the truck, and limits the possible size of the dynamo. Furthermore, the outside suspension of the dynamo, by placing the whole weight of the dynamo on an extension from one end of the truck, has a tendency to overbalance the truck at that end. In some instances counterweights have been placed on the opposite end of the truck to restore the balance.

The object of the present invention is to overcome these objections while retaining all the advantages of the outside suspension, and to this end I propose to mount the dynamo in a cradle or other suitable support, herein broadly termed suspension, which is swung or hinged at one end to the end crossbeam of the truck so as to be pivotally supported therefrom in such manner as to permit free vertical movement of the other end and at the same time cause the dynamo to move as the truck moves to maintain the parallelism of the driving axle and the dynamo shaft; the other or free end of the dynamo suspension being hung from the underbody of the car and partaking of the vertical movement thereof, but in such manner that the angular movement of the suspension as it moves with the truck is not restrained; and preferably in such manner that the dynamo does not partake of the tipping movement of the car body. In this manner the weight of the dynamo and its suspension is divided between the truck and the car-body, and the dynamo partakes at once of the angular movement of the truck and the vertical movement of the car-body, so that parallelism of the driving axle and the dynamo shaft is maintained as in the ordinary suspension, and striking of the dynamo against the underbody of the car is prevented. The driving belt is used as in ordinary practice, though its length may be increased by spacing the dynamo farther from the end crossbeam.

In the drawings Figure 1 is a longitudinal section through the end of a truck and car-body underframe, showing the dynamo and its suspension pivotally supported from the truck and under-frame in embodiment of the invention; Fig. 2 is a front elevation and Fig. 3 a plan of the same parts, Fig. 4 shows in detail, on a larger scale, the connection of a belt-tensioning lever to the dynamo, and Fig. 5 shows the rest for supporting the cradle when it is freed from its support on the underframe of the car.

The suspension for the dynamo A is here illustrated as a cradle made up of two U-shaped hangers *a* swung or hinged at their inner ends on a cross-rod $b$ supported in brackets $c$ on the end crossbeam of the truck, and tied together at their outer ends by a cross-bar $d$ and intermediately by straps $d'$. The cross-bar $d$ carries a stout pin or bolt $e$ on which is mounted a roller $f$ traveling on and supported by a guideway on the underframe of the car-body, which guideway is constructed to permit the roller to travel in the arc of a circle whose center lies in the king bolt or pivotal center of the truck axle, and comprises an upper confining plate or rail $g$ and a lower confining plate or rail $h$ supported on the underframe of the car and spaced apart to receive without binding the roller $f$. In the present instance the upper confining plate $g$ is shown as bolted to the center sills of a standard type of steel car in which the ends of the center sills are deepened so that their lower flanges dip toward the track, necessitating the insertion of a wedge-shaped block $i$ to level the upper confining plate $g$, but it will, of course, be understood that the invention is equally applicable to any other type of car. The lower confining plate $h$, in the particular construction illustrated, takes the form of an arc-shaped channel-iron, and is hung from the upper confining plate $g$ by hangers $k$, as shown in Fig. 3. In the cradle so constructed and mounted the dynamo A is pivotally supported by cross-rod $l$, and is elastically pulled or swung against the tension of the driving connection by the tensioning spring $m$ acting on the free end of tensioning lever $n$, in a manner which is now well known and needs no further description. The driving belt $o$ and driving pulleys $p$ and $q$, on the truck axle and dynamo shaft respectively, constitute the means commonly employed for driving the dynamo from the truck axle, and as usual the shaft $l$ which carries the dynamo is mounted in blocks $r$ resting on hangers $a$ and held in set position by set screws $s$, whereby the alinement of the dynamo shaft with the truck axle may be readily effected. It will be observed that tensioning spring $m$, in addition to its ordinary function serves an additional important function in that when the cradle swings on its shaft $b$ this swinging movement combines with the swing of the dynamo on its supporting rod $l$ caused by the tensioning spring, to produce a resultant movement of the dynamo and its pulley $q$ about the longitudinal axis of the truck axle as a center, thereby maintaining the tension on the driving connection. In this preferred construction there is a single supporting roller $f$ for the outer end of the cradle, whereby the outer end of the cradle has a swivel connection to the car-body, and the tipping of the car-body is not transmitted to the cradle. A similar swivel connection would, of course, result if more than one supporting roller were used, provided the two or more rollers were connected to a common yoke or frame, and the yoke or frame swiveled to cross-bar $d$. While I consider a swivel connection between the outer end of the cradle and the underframe of the car an important feature of my invention, and use it with great advantage in practice; yet it is not in every case essential to a successful embodiment of that characteristic feature of the invention which resides in the swinging or hinging of the dynamo suspension at one end to the truck so as to be pivotally supported therefrom while its other end is supported from the car-body by a connection permitting a radial swing.

It is important in constructions of the character herein described, to so arrange the dynamo that it does not interfere with the quick removal of the truck. To this end I have provided on the truck a supporting rest for the cradle, to which it may be dropped when its outer end is freed from the support on the underframe of the car, and by which the dynamo is held above the track. In the preferred construction shown the brackets $c$ carry a cross-bar $c'$ against which the truck end of the cradle will rest when it drops free of the car support, the dynamo being thereby supported wholly from the truck during removal and replacement thereof. It will be understood that when the truck is to be removed the lower supporting rail $h$ is removed, allowing the dynamo and cradle to drop free of the car support and rest on the cross-bar $c'$. When the truck is replaced the outer end of the cradle can be raised to the proper position and held there by placing blocks between the cradle and cross-bar $c'$ until the supporting rail $h$ is secured in place again.

In the accompanying drawings and the foregoing description I have illustrated and fully described the principle of my invention and the best embodiment thereof now known to me, and I shall now particularly point out, in the following claims, what I believe to be my invention, first remarking that so far as I am aware I am the first to mount a train lighting dynamo driven from the truck axle in a cradle or any other suspension, hung at one end by a hinge connection to the truck, so as to be pivotally supported therefrom and at the other end, by a connection permitting a radial swing, to the underframe of the car; whereby the dynamo partakes at once of the angular movement of the truck and the vertical movement of the car-body.

What I claim is:—

1. In a construction for driving a car-lighting dynamo from a truck axle, a dynamo suspension pivotally supported at one end from the truck and supported at the other end from the car-body by a connection permitting a radial swing, a pulley on the shaft of the dynamo, a driving pulley on the axle of the truck, and a driving connection extending from the driving pulley to the pulley on the dynamo shaft, whereby the dynamo partakes of the angular movement of the truck and the vertical movement of the car-body; substantially as described.

2. In a construction for driving a car-lighting dynamo from a truck axle, a dynamo suspension pivotally supported at one end from the truck, and supported at the other end by a support guided in a guideway on the underframe of the car and permitting a radial swing of that end of the cradle when the car rounds a curve, and a swiveling movement of the underframe with respect to the dynamo suspension when the car tips, a pulley on the shaft of the dynamo, a driving pulley on the axle of the truck, and a driving connection extending from the driving pulley to the pulley on the dynamo shaft, whereby the dynamo partakes of the angular movement of the truck and the vertical movement of the car-body, but does not partake of the tipping movement of the car-body; substantially as described.

3. In a construction for driving a car-lighting dynamo from a truck axle, a dynamo suspension pivotally supported at one end from the truck and supported at the other end from the car body by a connection permitting a radial swing, a pulley on the shaft of the dynamo, a driving pulley on the truck axle, a driving connection extending from the driving pulley to the pulley on the dynamo shaft, and mechanism for causing the dynamo to swing about the longitudinal axis of the truck axle as a center when the dynamo suspension swings on its pivot in response to vertical movement of the car-body; substantially as described.

4. In a construction for driving a car-lighting dynamo from a truck axle, a dynamo suspension pivotally supported at one end from the truck, a roller secured to the other end of the dynamo-support, a guideway for the roller supported from the underframe of the car and permitting the roller to move in the arc of a circle having the pivotal center of the truck for its center, a pulley on the shaft of the dynamo, a driving pulley on the truck axle, and a driving connection between the driving pulley and the pulley on the dynamo shaft; substantially as described.

5. In a construction for driving a car-lighting dynamo from a truck axle, a suspension in which the dynamo is pivotally mounted and which is pivotally supported at one end from the truck and is supported at the other end from the car body by a connection permitting a radial swing, a pulley on the dynamo shaft, a driving pulley on the truck axle, a driving connection extending from the driving pulley to the pulley on the dynamo shaft, and a tensioning spring connected to swing the dynamo on the pivot in its suspension against the pull of the driving connection; substantially as described.

6. In a construction for driving a car-lighting dynamo from a truck axle, a suspension in which the dynamo is pivotally mounted and which is pivotally supported at one end from the truck, a roller secured to the other end of the dynamo-support, a guideway for the roller supported from the underframe of the car, and permitting the roller to move in a circle having the pivotal center of the truck for its center, a pulley on the shaft of the dynamo, a driving pulley on the truck axle, a driving connection between the driving pulley and the pulley on the dynamo-shaft, and a tensioning spring connected to swing the dynamo on the pivot in its suspension against the pull of the driving connection; substantially as described.

7. In a construction for driving a train-lighting dynamo from a car axle, a dynamo suspension pivotally supported at one end from the truck and supported at the other end from the car-body, in combination with a supporting rest on the truck on which the dynamo-suspension drops when freed from its support on the car-body, whereby the dynamo is supported wholly from the truck during removal and replacement thereof; substantially as described.

8. In a construction for driving a train lighting dynamo from a car axle, a dynamo suspension hinged at one end to the outer cross-beam of the truck and supported at the other end from the car-body, in combination with a cross-bar on the truck below the hinge and against which the truck end of the suspension swings when the outer end is freed from its support on the car-body, whereby the dynamo is supported wholly from the truck during removal and replacement thereof; substantially as described.

In testimony whereof I affix my signature, in presence of two witnesses.

PATRICK KENNEDY.

Witnesses:
  Aug. Treadwell,
  Walter E. Green.